United States Patent [19]

Suller et al.

[11] Patent Number: 5,551,220
[45] Date of Patent: Sep. 3, 1996

[54] ENVIROMENTALLY SAFE CUTTING MECHANISM FOR STALKS OR STEMS OF PLANTS AND/OR GRASS LIKE VEGETATION

[76] Inventors: Attila Suller, 46 Urrétje u., Debrecen, H-4032; Árpád Tóth, 19 Templom u., Debrecen, H-4225, both of Hungary

[21] Appl. No.: 376,118

[22] Filed: Jan. 10, 1995

[30] Foreign Application Priority Data

Jul. 16, 1992 [HU] Hungary .............................. P 92 02331

[51] Int. Cl.⁶ .............................. A01D 34/68; A01D 34/82
[52] U.S. Cl. .............................. 56/11.9; 56/13.6; 56/17.2; 56/17.5; 56/255
[58] Field of Search .............................. 56/11.9, 13.5, 56/13.6, 14.3, 14.4, 17.2, 17.5, 255, 503

[56] References Cited

U.S. PATENT DOCUMENTS

| | | | |
|---|---|---|---|
| 2,504,268 | 4/1950 | Lee | 56/255 |
| 2,585,405 | 1/1952 | Reiter | |
| 3,701,238 | 10/1972 | Hintze Jr. | 56/10.4 |
| 4,031,696 | 6/1977 | Fleigle | 56/11.9 X |
| 4,594,842 | 6/1986 | Wolters et al. | 56/14.3 X |
| 4,733,525 | 3/1988 | Pellenc et al. | 56/503 |
| 4,881,363 | 11/1989 | Terai et al. | 56/255 |

FOREIGN PATENT DOCUMENTS

| | | |
|---|---|---|
| 1094356 | 1/1955 | France . |
| 270284 | 1/1969 | Germany . |
| 286501 | 1/1983 | Germany . |
| 204642 | 1/1988 | Hungary . |
| 492387 | 1/1970 | Switzerland . |
| 1119648 | 7/1968 | United Kingdom . |
| 1591489 | 6/1981 | United Kingdom . |

*Primary Examiner*—George A. Suchfield
*Attorney, Agent, or Firm*—Birch, Stewart, Kolasch & Birch LLP

[57] ABSTRACT

A mechanism for cutting of stalks or stems of plants and/or grass-like vegetation, in an environmentally safe manner, has counter-blades arranged on a circular path and rotary blades positioned above the counter-blades. The ratio of the surface area of the counter-blades actually taking part in the cutting and the surface area of the free spaces between them, in relation to each other, is smaller than a value of one. A distance of "h" between the counter-blades and the rotary blades is a value between 0–2 mm, and the peripheral speed of the rotary blades is between 10 and 50 m/sec.

18 Claims, 3 Drawing Sheets

ENVIROMENTALLY SAFE CUTTING MECHANISM FOR STALKS OR STEMS OF PLANTS AND/OR GRASS LIKE VEGETATION

This application is a continuation of PCT application no. PCT/HU93/00044, filed on Jul. 13, 1993.

FIELD OF THE INVENTION

The subject of the invention is a mechanism the cutting stalks or stems of plants and/or grass-like vegetation in an environmentally safe manner. The a cutting mechanism has at least one cutting unit, which has counter-blades arranged on a circular path at a certain distance from each other and moving blades positioned above said counter-blades, while the ratio of the cutting surface of the counter-blade and the surface area of the free space between two neighbouring cutting surfaces is smaller than one.

DESCRIPTION OF THE BACKGROUND ART

Numerous well known cutting mechanisms exist in the area of cutting with counter-blades. With the majority of these curbing mechanism there is a frictional connection between the moving blades and the counter-blades.

The energy requirement for known cutting mechanisms of this type is high, because of the friction. Beyond this the wear of operating components is of a significant magnitude.

Besides this, the speed of revolutions of the rotary discs to which the blades are mounted, is restricted due to the frictional connection between the counter-blades and the moving blades. The moving blades can only rotate at a peripheral speed of about 3–6 m/sec. A result of this is that the cutting, guiding and collection of the pieces of vegetation, can only be carried out at a low work rate.

A further disadvantage of the previously listed cutting mechanisms is that due to the high energy demand, neither accumulators nor low voltage electric motors can be utilized as sources of energy for the drives of said cutting mechanisms.

A large section of these cutting mechanisms is made up of the alternating cutting mechanisms, such as for example the U.S. Pat. No. 4,881,363. The energy requirement for such a cutting mechanism, which is necessary, in part for the frictional losses and in part for the transmission, assumes the utilization of an internal combustion engine. The utilization of such an internal combustion engine, however, is very complicated.

The U.S. Pat. No. 3,701,238 discloses a grass cutting mechanism which has partly rotary and partly alternating characteristics, for which the energy supply is from a tractor because of the large energy requirement.

With the solution known from the French Patent No. 1,094,336, the vegetation stems are cut with shearing by the friction of moving blades and counter-blades rubbing against each other. With this solution the energy demand arising from the friction and the mechanical power transmission is similarly supplied by a tractor or internal combustion engine. A disadvantage is also the fact that because of the constant friction, the peripheral speed of the rotary blades can not be increased above 3–6 m/sec. This slows down the rate of work.

With these types of cutting mechanisms, the handling of the cut grass or produce after cutting, is not solved. The cut stems therefore pile up in front of the scythe and obstruct the forward movement of the cutter. A further disadvantage is that the long guiding tines utilized on such mechanisms, pierce the tree leaves lying on the grass, and as a result of this, the grass stems are bent down before cutting. As a result of this, blocking of the cutting mechanism can not be prevented. A disadvantage of the known solutions, is also the fact that the cutting mechanism is prone to damage, due to the low peripheral speed of 3–6 m/sec, relating to the low revolutions, the rotary blades are rigidly attached, and thus they cannot deviate in the case of obstruction.

The Hungarian patent No. 204,642 entitled "Procedure for energy saving cutting of stemmed plants, together with cutting mechanism", has counter-blades, and rotary blades with peripheral speed of 60–90 m/sec, fitted with 3.5 mm spacing between them and the counter-blades. With this solution, the energy required for cutting is low compared to the mowing system. At the same time, the high work rate characteristic of rotary cutters can be provided. The possibility of damage can be significantly reduced by articulated suspension of the blades.

A disadvantage of this solution is that fine cutting of the plant stems, that is good quality cutting, cannot be carried out, because due to the fixed cutting gap and the high peripheral speed of the rotary blades, the fine grass stems are not cut, but either torn or bent over the counter-blade. Tearing of the plant stems results is coarse injury, which heals up with difficulty. The part of the plant remaining in the soil, dries out by way of-the large injury, and only shoots out again with difficulty. The grass surface therefore becomes discolored and its condition deteriorates. In the case of cutting crop producing plants, the above mentioned injuries cause a reduction in crop, and even the danger of infection exists with the coarse injuries. It can accordingly be concluded that use of this type of machine could in practice be damaging to the environment.

A further disadvantage of the expounded solution, is that the high peripheral speed of the rotary blades, and the speed of revolution, ensuring the high, 60–90 m/sec peripheral speed, of the blade holder disc, is accompanied by a relatively high level of noise, which in many cases, for example, cutting of grass areas and parks of dwelling houses, hospitals and holiday resorts, can be extremely annoying and damaging to the environment.

Finally, a disadvantage is represented by the fact that fine and dense lawn grass, cannot be cue with this type of grass-cutter, because the surface of the counter-blades is excessively large and at the same time the free spaces between the counter-blades are excessively small and narrow. The ratio of the surface area of-the counter-blades and of the free spaces between them, in relation to each other, is one, or greater than one. Due to the narrowness of the free spacess, the grass stems will not go into the spaces, which results in the grass stems being bent over as the cutting mechanism moves forward. This results in patchy cutting, which spoils-the image by the stubble area left behind. As a consequence of this, in practice, in the case of fine dense lawn grass, cutting with the above mentioned machine can only be done at a low work rate.

The English Patent No. GB, A, 1 591 489 discloses a cutting mechanism, where the distance between the counter-blades and moving blades is 5 mm. In the interest of achieving a satisfactory cutting result at this spacing, a peripheral speed of a magnitude of about 80 m/s is necessary. With this solution, due to the 5 mm distance, the grass stems are not cut in the course of impact with the rotary blades, but they are layed over the cutting edges of the counter-blade and are broken off. Due to this, the rotary blades must overcome an increased resistance. Because of this increased resistance and the high peripheral speed, the energy requirement of these types of cutting mechanisms is fairly large. When an electric motor drive operated from an accumulator is used for driving of the rotary blades, the time which can be utilized for grass cutting is extremely short. Besides this, due to the high peripheral speed, the cutting mechanism is rather noisy.

SUMMARY OF THE INVENTION

Thus, the objective of the invention is to create a simple cutting mechanism whereby perfect cutting results can be produced with less energy expenditure.

This problem will be solved, by the distance between the rotary blades and the counter-blades, being adjustable between $0 < h \leq 2$ mm, and the peripheral speed of the rotary blades, being adjustable between 10–50 m/sec.

The small spacing between the counter-blades and the rotary blades makes perfect cutting of the vegetation stems possible at a low peripheral speed (10–50 m/sec). This is mainly due to the fact that, within the given spacing, the supporting effect of the counter-blades is so great, that at the peripheral speed range, the plant stems hardly bend and do not lay over the edges of the blades. Moreover, the rotary blades do not make contact with the counter-blades, and due to this, only a small measure of friction occurs.

With the cutting mechanism according to the invention, the stalks and stems of plants can be perfectly cut with a very small expenditure of energy. By way of this, electric motor drive operating from accumulator becomes possible, which results in operation of the cutting mechanism for a long period. Beyond this, the noise level of the cutting mechanism forming the subject of the invention, is extremely low because of the negligible friction of the moving components, together with the low peripheral speed of the rotary blades.

Besides this, the adjustment, of distance "h" between the rotary blades and the counter-blades, and of the peripheral speed of the rotary blades, can be applied in an advantageous manner.

By means of this, perfect cutting of both thick stemmed and thin stemmed plants becomes possible, together with avoidance of coarse injury to the plants. For thin stemmed plants a minimal space is set, for thick stemmed plants a space of 2 mm is set. The space is set between the two limiting values for other plant types.

With adjustment of the peripheral speed of the rotary blades to a value between 10–50 m/sec, both thick and thin stemmed plants and grasses can be cut at a high work rate. The grass is neither bent forward nor flattened during forward motion of the cutting mechanism. As a result of this, the grass passes without obstruction into the space between the counter-blades, where the rotary blades, during rotation, press the stems against the edges of the counter-blades, where these are cut in a perfect manner without tearing.

According to the invention, it is advantageous if the diameter of the circle encompassing the free ends of the counter-blades, is at most, 20% greater-than the circular path described by the free ends of the rotary blades. This structural formation eliminates catching of tree leaves or similar kinds of vegetation, arising from excessive forward projection of the counter-blades, thus avoiding blockage of the cutting mechanism.

The counter-blades can be arranged on a circular path, fixed to the frame of the cutting mechanism, while the rotary blades are positioned rotatably mounted above them.

The counter-blades can also be rotatably journalled on their circular path. This makes it possible to alter the surface area ratio of the counter-blades and the free spaces between them, by simply rotating the counter-blades to a different spacing distance.

It is also advantageous according to the invention, if several cutting units comprising rotary blades and counter-blades are arranged on the same frame.

It is possible for every cutting unit to have a separate drive which is connected to an external energy source, but a common drive for several cutting units can also be conceived, connected to an external source of energy.

The source of energy can be a battery, an accumulator, a solar cell, or a hydromotor connected to an external source of energy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is expounded in detail, with construction examples based on drawings which are given by way of illustration only, and thus are not limitative of the present invention, and wherein.

DESCRIPTION OF THE PREFERRED EMBODIMENTS

Figure 1:
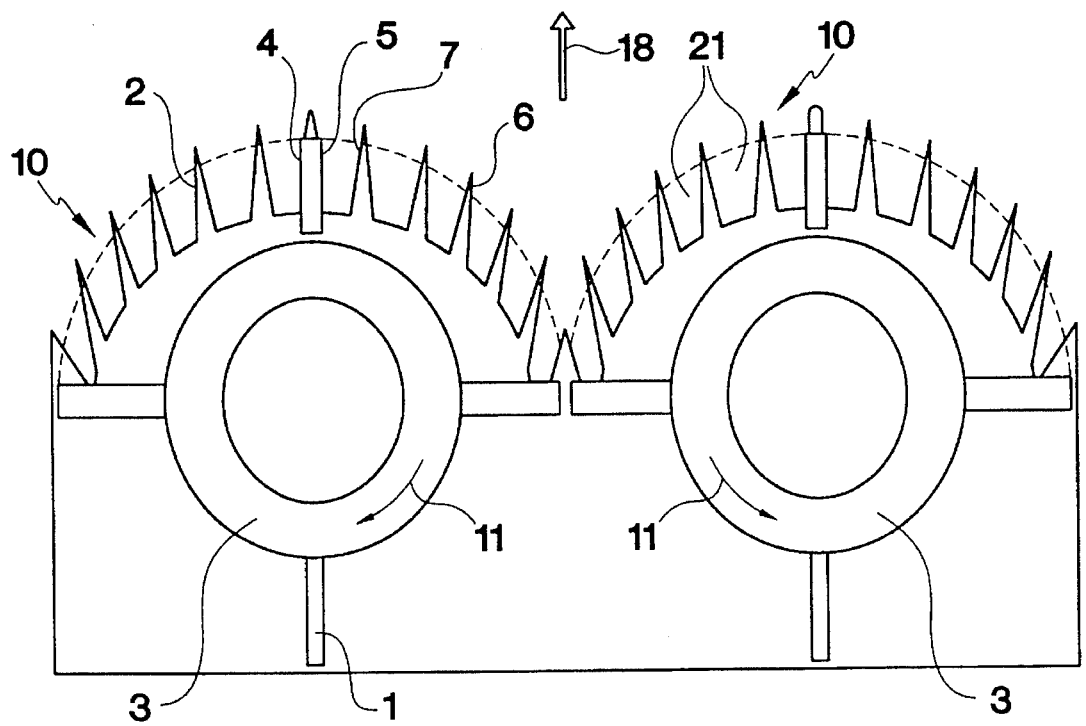
FIG. 1 is a theoretical top-view layout of a cutting mechanism according to the invention.
Figure 2:
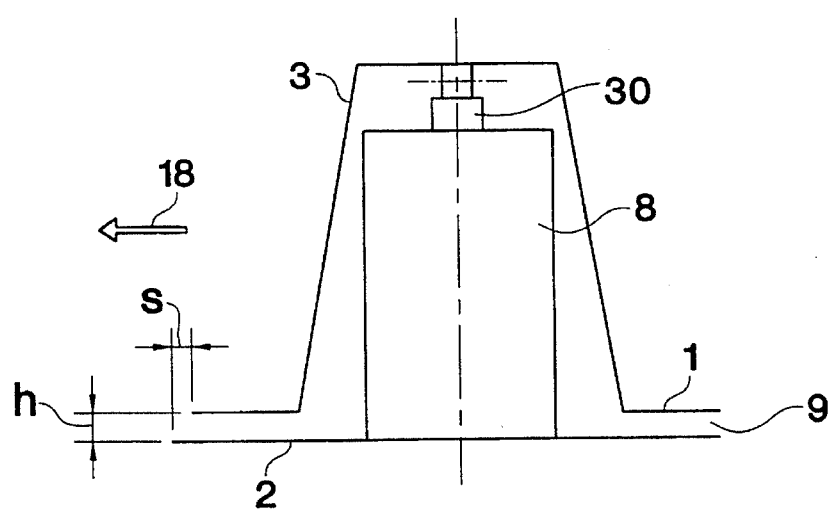
FIG. 2 is a vertical section through the cutting unit of the cutting mechanism depicted in FIG. 1.

In the example of the cutting mechanism according to the invention, as depicted in FIGS. 1 and 2, the cutting mechanism has cutting units 10. The cutting unit 10 has a blade group containing rotary blades 1 serving for cutting stalks and stems of plants, and new tipped counter-blades 2, arranged in a circular path on frame 9. According to the example, the rotary blades 1 are positioned at 90° to each other, thus four rotary blades 1 are contained in each cutting unit 10. Naturally the number of rotary blades 1 can be changed, in the case of another example. The rotary blades 1, complete with adjusting appliance or means for adjusting 30, adjusted to the height setting, are positioned on the lower flange of rotating grass guide drum 3 above the counter-blades 2.

According to the invention, the diameter of the circle encompassing the free ends of counter-blades 2 is 20% greater than the outer diameter of the rotary path of rotary blades 1. In the case of cutting thin stemmed grasses, it is expedient to select a value smaller than 20%. In the example shown, the diameter of the circular path of counter-blades 2, is 20 mm greater than the diameter of the circular path of rotary blades 1 as indicated by "s". The forward projection arising from this, is shown in FIG. 2.

Between the rotary blades 1 and the counter-blades 2 lying below them in one plane, there is a gap "h", thus there is no friction between them. The magnitude of this gap "h" is simply adjustable by raising or lowering grass guide drum 3, which holds the rotary blades 1, dependent on the thickness dimension of the plant or grass stems. The optimum value of gap "h" is between 0–2 mm.

In the constructional example shown, the surface area ratio of the counter-blades 2 and the free spaces 21 between them, in relation to each other, is 0.8, that is, selected at a value less than one.

The rotary blade 1 has an edge 4 on one side and edge 5 on the other side, while the counter-blade 2, in the example shown, is edged on one side 6 and on the other side 7, but according to the invention, these counter-blades 2 can also be without edges.

In the example shown, the counter-blades 2 are arranged in a semi-circle in the direction of advance, indicated by arrow 18. Although this is not shown in the figure, the counter-blades 2 can also be arranged on a disc, with rotary journal mountings, fixed to frame 9.

The grass guiding drum 3, holding rotary blades 1, is arranged so as to be adjustable by raising or lowering, on drive shaft 8, which is mounted indirectly to frame 9. In the case shown, the means for rotating rotary blade 1 or drive 8 is a light current electric motor with an output of 200 W.

The cutting mechanism shown in the example, has two cutting units 10 positioned beside each other, that is, has two groups beside each other, containing counter-blades 2 arranged in circular paths, and positioned above them at a gap distance of "h", two groups of rotary blades 1 positioned beside each other in a circular path. The rotary blades 1 move in a circular path contra to each other, in directions indicated by arrows 11 (FIG. 1).

Figure 3:
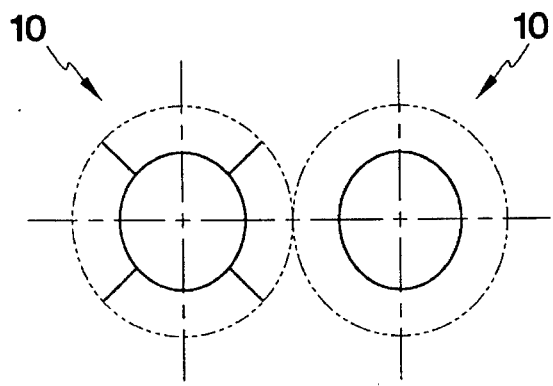
FIG. 3 is the top-view of an example of the circular path of the rotary blades.

FIG. 3 shows an example of two cutting units 10 combined in one cutting mechanism, where there is no overlap of the rotary paths of the two sets of rotary blades 1 arranged on rotary paths, positioned beside each other. In this case the revolutions of the two neighboring cutting units 10 containing rotary blades 1, need not be synchronized with each other.

Figure 4:
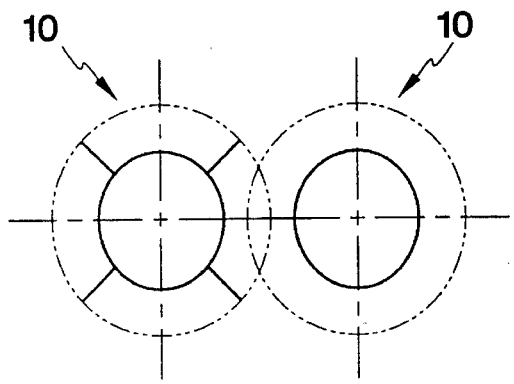
FIG. 4 is the top-view of another example of the circular path of the rotary blades.

With the example shown in FIG. 4, the circular paths of rotary blades 1 arranged in circular paths, of two cutting units 10 positioned beside each other, overlap each other. Accordingly the revolutions of the two cutting units 10 must be synchronized.

Before starting up, first the predetermined gap distance "h" (1 mm in the constructional example) between rotary blades 1 and counter-blades 2, must be precisely set, then drive 8 is started.

With the cutting mechanism advancing in the direction of arrow 18, the stems of grass and plants enter between the counter-blades 2. Rotary blades 1 rotate in the direction of arrow 11 with the edges 4 and 5 of rotary blades 1 pressing the stems against counter-blades 2 to cut the stems by shearing. After this, the cut grass stems are thrown on to the rotary blades 1 and the contra-rotating grass guiding drums 3, which carry them to the center and throw them backwards.

Figure 5:
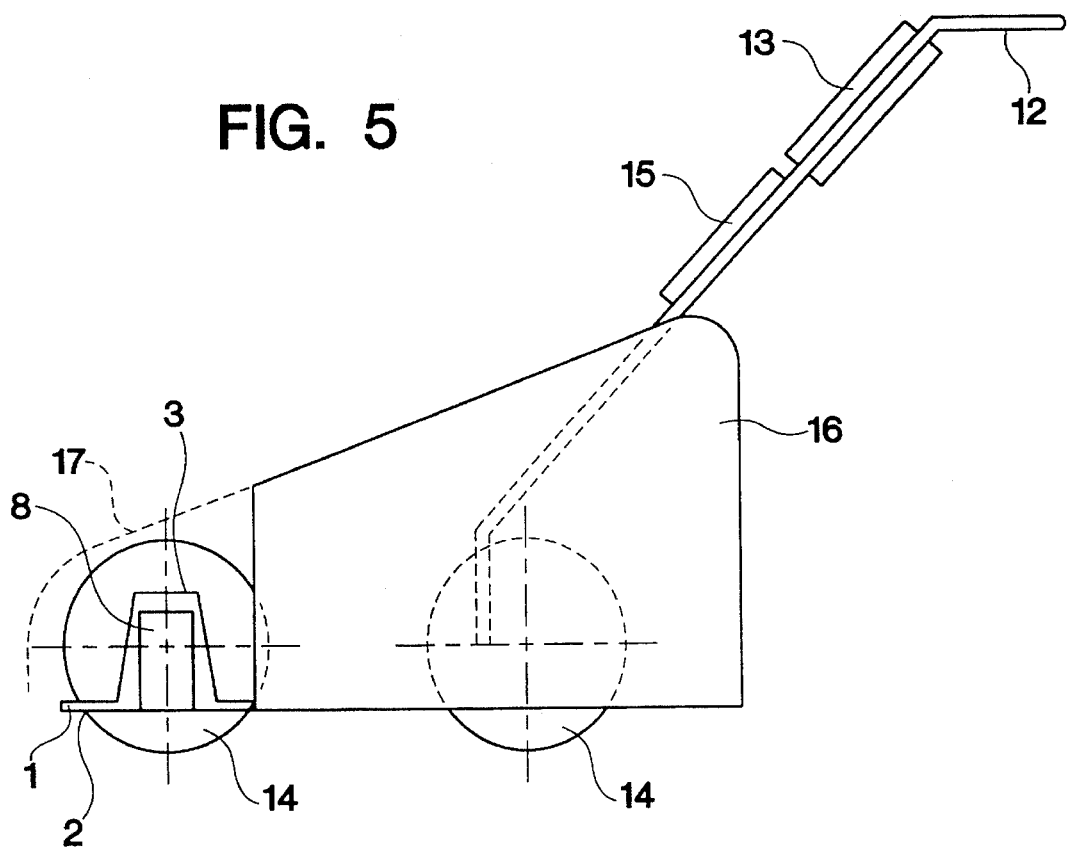
FIG. 5 is the side view, partly in section, of an example of the cutting mechanism according to the invention.
Figure 6:
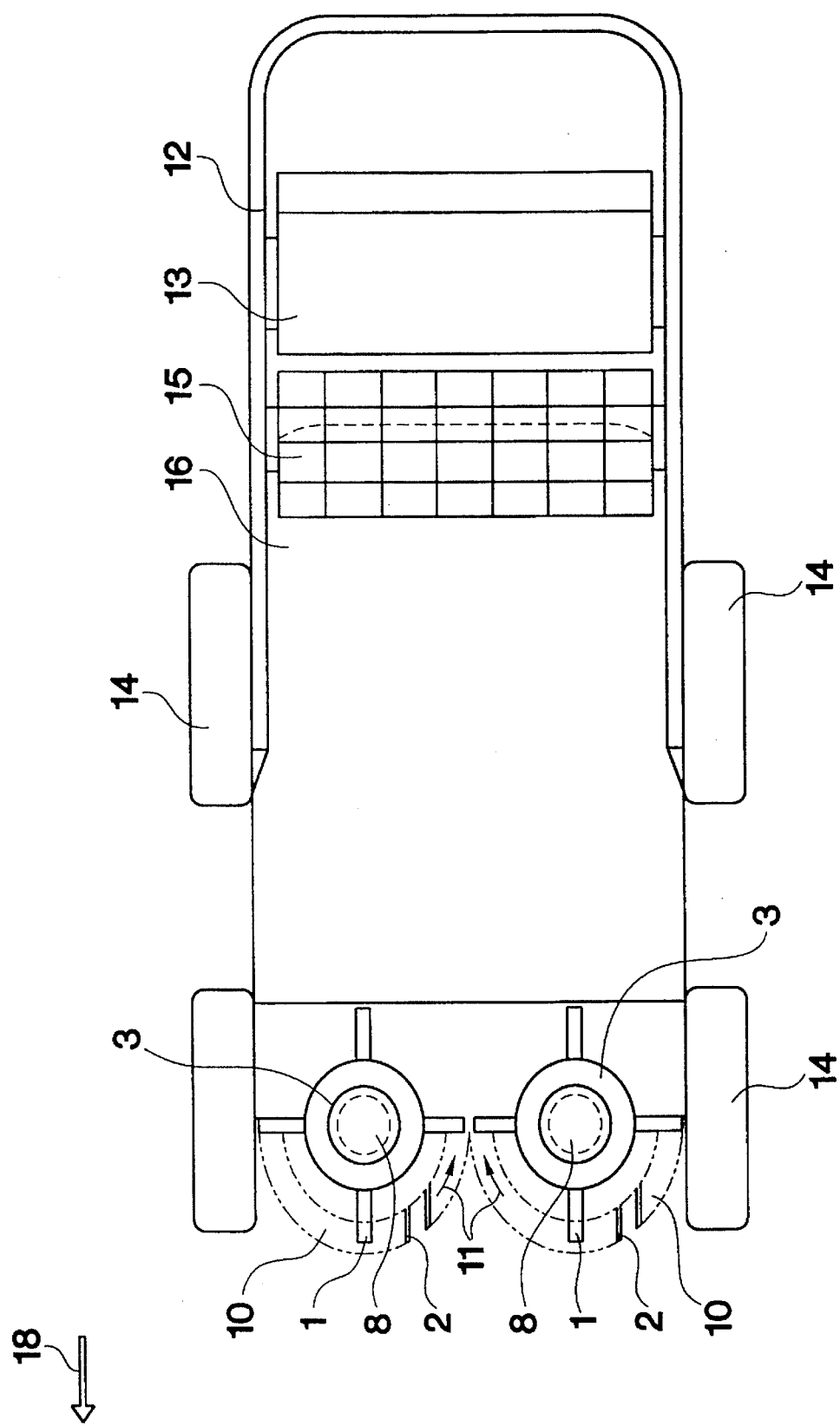
FIG. 6 is the top-view, partly in section, of the cutting mechanism depicted in FIG. 5.

The cutting mechanism according to the example shown in FIGS. 5 and 6, similarly has two cutting units 10. Both cutting units 10 are driven separately by an electric motor forming drive 8, contra-rotating in accordance with arrow 11. It can be clearly seen that due to the gap distance "h", set at a maximum of 2 mm, there is no frictional connection between the rotary blades 1 and the counter-blades 2.

In this latter example of FIGS. 5 and 6, the feed for the electric motors of drives 8, which are mounted on frame 9 and covered by the conical grass guiding drums 3, is from energy source 13. In this example, an accumulator is positioned on hand-lever 12, similarly connected to frame 9. The additional energy for the accumulators forming energy source 13, is supplied by a charging appliance from the mains, or as in this example, by built-in solar cells 15. A grass basket 16, below solar cells 15, serves for collecting the cut grass. In this case, the cutting mechanism is provided with a cover 17.

Before putting the mechanism into operation, the accumulator 13 is charged, by either a charger from the mains, or by solar cells 15, the cutting height is set with height adjusting wheels 14, then drive 8 is started.

In the following, the process is similar to the preceding example, the cut vegetation is passed backwards by the grass guiding drums 3 into grass basket 16.

The advantage of the invention is that due to the pre-set gap distance "h" between the rotary blades 1 and counter-blades 2, being 0–2 mm, frictional losses do not occur, and at the same time in the case of lower speed of rotary blades 1 also, shearing is ensured, requiring minimal energy. The fine stemmed grass is cut with clean shearing and not by tearing. Due to this, the injury to the part of the plant remaining in the ground heals up quickly, does not dry out and does not become infected, and in this way the stubble shoots out much sooner.

The direct rotation of rotary blades 1 by drive 8, makes unnecessary the complicated power transmission system, utilized on traditional cutting mechanisms, which are accompanied by large energy losses.

Practical measurements prove that a fraction of the energy required for traditional cutting mechanisms, is sufficient for operating the cutting mechanism according to the invention. In practice, the energy demand of the cutting mechanism according to the invention, for a cutting width of 40 cm and a work rate of 3–4 km/h, is merely 120 W. This makes it possible for an accumulator or even non-rechargeable dry batteries to serve as an energy source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A mechanism for cutting stalks or stems comprising at least one cutting unit having counter-blades and moving blades, the counter-blades being arranged on a circular path below the moving blades, a predetermined spacing h being provided between the counter-blades and the moving blades, the predetermined spacing being in the range of $0 < h \leq 2$ mm, the counter-blades having free spaces therebetween, the counter-blades each having a surface area and a ratio of the counter-blade surface areas to an area of the free spaces being less than one, the at least one cutting unit further having means for rotating the moving blades, the means for rotating driving the moving blades at a peripheral speed between 10 and 50 m/sec.

2. The mechanism according to claim 1, wherein the predetermined spacing h is the same between all of the counter-blades and the moving blades.

3. The mechanism according to claim 1, wherein the counter-blades extend beyond the rotating blades for a predetermined distance.

4. The mechanism according to claim 3, wherein the counter-blades each have free ends and wherein the moving blades of each cutting unit move along a circular path, a diameter of a circle encompassing the free ends of the counter-blades is at most 20% greater than an outside diameter of the circular path of the moving blades.

5. The mechanism according to claim 1, wherein two cutting units are provided as the at least one cutting unit, each of the cutting units having counter-blades and moving blades.

6. The mechanism according to claim 5, wherein each of the cutting units has means for rotating the moving blades whereby the moving blades are independently driven.

7. The mechanism according to claim 6, wherein the means for rotating are positioned beneath the moving blades.

8. The mechanism according to claim 6, wherein the means for rotating are all connected to an external source of energy.

9. The mechanism according to claim 1, wherein the means for rotating is positioned beneath the moving blades.

10. The mechanism according to claim 9, wherein the means for rotating is connected to an external source of energy.

11. The mechanism according to claim 1, wherein each of the cutting units has means for rotating the moving blades whereby the moving blades are independently driven.

12. The mechanism according to claim 1, further comprising means for adjusting the predetermined spacing h between the counter-blades and the moving blades.

13. The mechanism according to claim 1, wherein the means for rotating adjust the peripheral speed of the moving blades.

14. The mechanism according to claim 1, further comprising a frame on which the counter-blades are fixed on the circular path, the rotary blades being rotatably mounted above the counter-blades.

15. The mechanism according to claim 1, wherein a plurality of cutting units are provided as the at least one cutting unit, each of the cutting units having counter-blades and moving blades.

16. The mechanism according to claim 1, wherein the counter-blades each have free ends which have a tip, the tips of the counter-blades all point in a same direction.

17. The mechanism according to claim 1, wherein two cutting units are provided and wherein the means for rotating rotates each of the moving blades around generally circular paths which fail to intersect.

18. The mechanism according to claim 1, wherein two cutting units are provided and wherein the means for rotating rotates each of the moving blades around generally circular paths which intersect.

* * * * *